April 19, 1966 B. B. SABOUNI 3,247,294
CONCRETE PRODUCTS AND METHODS FOR MAKING SAME
Filed Nov. 14, 1963

INVENTOR.
BY Bahidj B. Sabouni

United States Patent Office 3,247,294
Patented Apr. 19, 1966

3,247,294
CONCRETE PRODUCTS AND METHODS FOR MAKING SAME
Bahidj B. Sabouni, P.O. Box 727, Berkeley, Calif.
Filed Nov. 14, 1963, Ser. No. 325,205
12 Claims. (Cl. 264—42)

This application is a continuation-in-part of my application Serial Number 76,431 filed October 3, 1960, now abandoned.

This invention relates to concrete products and methods for making same. More particularly, the invention involves a new low density cellular concrete that possesses unique structural characteristics, including an exceptionally high compressive strength to weight ratio.

In brief, the present invention involves a concrete product formed from a cementitious mixture, including discrete pellets of a compressible, relatively non-hygroscopic and low density substance. The invention more specifically contemplates the use of compressive force to place the discrete pellets under resilient compression while the mixture is confined within a mold. Although the amount of compressive force used may vary, it is necessary to apply pressures in excess of 5 p.s.i., and preferably in the range of 10 p.s.i. and more to obtain the most advantageous and unexpected results. Moreover, the pressure once applied should be maintained against the cementitious mixture until after an initial set occurs, and the pressure should be held at a substantially uniform level.

It has been found that the combination of steps, including the application of compressive force to a cementitious mixture containing discrete pellets of a compressible substance such as polystyrene, may be used to create a prestressing of cementitious binder material. Although a compressive force of less than five pounds per square inch may be applied by conventional vacuum methods to extract water from the mixture to increase the strength of a resulting product, the small amount of internal prestressing which might occur is of little consequence.

This invention especially contemplates the preparation of cementitious mixtures comprising hydraulic cement, water, a fibrous water-absorbing filler such as asbestos, and discrete pellets of expanded polystyrene. In preparation of such a mixture, the water is initially added to the cement in an amount sufficient to form a relatively harsh, dry preparation. After thoroughly mixing, suitable amounts of fibrous filler and discrete pellets of polystyrene may be added to the preparation. The mixture is then placed in a water-porous mold and immediately subjected to an application of compressive force, preferably by means of vacuum in a closed system. The applied compressive force, which is preferably in the range of 10 p.s.i. or more, places the discrete pellets of polystyrene under resilient compression while removing excess water and densifying the fibrous filler. Importantly, since the resilient compaction of the polystyrene pellets results in an internal prestressing of the cementitious binder material, the compressive force must be maintained until the cementitious mixture takes it initial set. If otherwise, lines of weakness may develop in the final product.

The use of polystyrene and other substances which are also heat-fusible are of particular importance in forming a cellular concrete that is substantially moisture-proof. It has been found that a concrete product made with polystyrene pellets in the manner above described may subsequently be heated to temperatures which cause the fusible pellets to melt and disperse by capillary action into the matrix of cement and fibrous filler. This result can be produced during the curing of products at elevated temperatures, such as are used in autoclaving.

Concrete products having heat-fusible pellets as part of their constituency may also be subjected to a treatment of flash-heating one or more surfaces. When a flame or other "flash heat" is applied to the surface of such products the exposed pellets that are embedded in the surface are melted, leaving substantially spherical-shaped voids. The resulting concrete surface is extremely well adapted for grouting and lamination bonding processes. Moreover, the pellet-defining voids impart to the concrete a sound attenuating characteristic not possessed by regular smooth surfaces. It will also be noted that the dimpled surface appearance produced is extremely attractive, especially when brush-painted and then rolled to produce contrasting colors between the exposed concrete matrix and its spherical voids.

Useful high strength building components and panels can be made with products contemplated by this invention by foaming polyurethane or polystyrene in contact with and between two concrete "boards," prepared by the methods referred to above. The foamed material forms an excellent mechanical bond with a dimpled surface as well as with the cemented polystyrene pellets, and provides an intermediate layer of insulation. Structures formed by this method have proved to be strong and rigid, while also providing the necessary thermal and sound insulation that is required for use as a wall panel.

Therefore, it is one object of this invention to provide a concrete product that is formed from a cementitious mixture including discrete pellets of a compressible, relatively non-hygroscopic and low-density substance, said mixture being subjected to compressive forces that induce an internal prestressing of a cementitious matrix.

A second object is to provide a concrete product formed from a cementitious mixture including relatively non-hygroscopic and heat-fusible pellets, wherein said product has been heated during or after curing to render the cellular concrete substantially moisture-proof.

It is another object of the invention to provide a concrete product formed from a cementitious mixture including heat-fusible pellets, wherein a surface or surfaces of said product have been flash-heated to melt the pellets which are exposed upon the surface to create voids within the surface.

A further object is to provide a concrete product having an exceptionally high compressive strength/weight ratio and being impregnated with non-hygroscopic material such as polystyrene.

Other objects of this invention will be apparent to persons skilled in the art of concrete products and structures, especially in view of the accompanying drawings and the following description.

In the drawings forming a part of this application and in which like parts are identified by like reference numerals throughout the same:

One method of this invention involves the preparation of a cementitious mixture comprising binding material, fibrous filler, and discrete pellets of a compressible, relatively non-hygroscopic and low-density substance. For example, a wet slurry mixture of water, hydraulic cement, and asbestos may be made, and to this is added a quantity of polystyrene pellets. The pellets are to be thoroughly mixed into the slurry, insuring that each pellet is coated by the cement. This prepared mixture is then placed into a water porous mold and subjected to a compressive force, squeezing as much water from the mixture as is feasible without causing a collapse of the pellets.

It may be noted that the application of the compressive force will produce a volumetric reduction that may be attributed largely to the extraction of excess water and the physical compaction of the fibrous filler. But also, and more importantly, polystyrene pellets, being of a cellular and compressible nature, will be reduced to a smaller size, thereby contributing to the resulting volumetric reduction. Each polystyrene pellet, while being compressed, exerts an internal biasing force upon the cementitious mixture surrounding it. The cumulative effect of these pellets is such as to produce an internal prestressing of the concrete, densifying and compacting the cementitious binder material. After the binder takes a set the molded concrete product may be removed from its mold; and, in accordance with conventional practices, the resulting concrete product may be cured.

The application of compressive force should be maintained with substantial uniformity during the time that the cementitious mixture is setting up. Removing the pressure prior to initial setting will produce lines of weakness in the product, and even a substantial variation in pressure is apt to be harmful.

Although expanded polystyrene pellets are available in various sizes, the best results have been obtained using a range of sizes. Moreover, the use of large diameter pellets is extremely important to the manufacture of lightweight products since the bulk density of the larger pellets is less than smaller pellets. In any event, it is believed that the average particle size of the pellets employed should be greater than $1/16$ inch diameter. Substances such as Microballoons, which are at most 500 microns, are much too small for beneficial use as the sole ingredient of discrete pellets.

Figure 1:
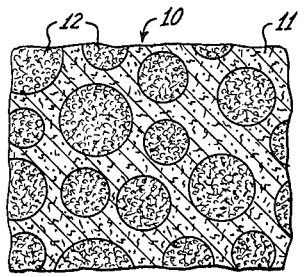
FIG. 1 is a magnified section, taken through a concrete product formed in a manner contemplated by this invention.

In FIG. 1 of the drawings there is shown a representative product 10 formed by the above described process. The concrete structure comprises a matrix 11 including hardened cement with fibrous strands of asbestos imbedded therein. Polystyrene pellets 12 also comprise a major part of the concrete, but since the pellets are structurally weak, the strength of the concrete is dependent upon its matrix. Consequently, the concrete structure of FIG. 1 may be considered basically a prestressed matrix with pellet-occupying voids.

The polystyrene pellets, as referred to above, may be produced from granular type products which are commercially available and manufactured by United Cork Companies of New Jersey, as well as other companies. The commercially sold granulated product is treated with steam in a steam expander at a temperature of about 200° F. As a result of this treatment the granular polystyrene is expanded from an average size of approximately $1/32$ inch diameter and having a 40 lbs./cu. ft. density, to an average size of $1/16$ to $1/8$ inch diameter with a bulk density of wide range but being approximately 2 lbs./cu. ft., and lighter. In the expanded condition the polystyrene pellets possess a relatively smooth outer substantially spherical surface with an inner cellular structure of membranes. Because of their relatively smooth outer surfaces these pellets have a comparatively low coefficient of friction, which allows them to be more easily dispersed in a wet slurry mixture of a rather harsh consistency. The further fact that the expanded granules of polystyrene are substantially spherical in shape is a primary reason for their ability to withstand considerable hydraulic pressures without collapsing. And in this respect it has been found that most polystyrene pellets are capable of withstanding hydraulic pressures in excess of 25 p.s.i. Thus, it will be realized that the polystyrene pellets are especially well suited for use in making the concrete products contemplated by this invention.

Within the broader scope of this invention it is to be understood that various types of hydraulic cements may be utilized. However, a preferred form of cementitious material is prepared by using Portland cement.

Similarly, while an asbestos fiber has been used with great satisfaction, other types of filler material including other kinds of mineral or organic fiber (or granular material such as silica flour) might also be employed.

It is also believed that discrete pallets of lightweight substances other than polystyrene might be utilized. Especially in view of the increasing number of new plastic substances that are becoming available, it is further contemplated that some of these might be used with equal or greater advantage than polystyrene for producing concrete products having high compressive strength/weight ratios. Therefore, it is to be realized that the broader aspect of the invention teaches the use of lightweight, hollow or cellular pellets, said pellets being substantially non-hygroscopic and resilient.

In carrying out the manufacturing process outlined above I have employed a mold for compacting the mixture under a compressive force. The mere inclusion of discrete lightweight and compressible pellets will not produce a concrete product having a high strength to weight ratio. For this reason I have provided a perforated box having a loose fitting and removable lid. The box is lined with a woven cloth, such as muslin or burlap which will have a weave size to permit water to flow freely from the mold without permitting an extrusion of the cement or solid materials. After a cementitious mixture is disposed in the box its lid is placed in position and a compressive force is applied.

The compressive forces used in forming products in accordance with this invention are preferably applied either wholly or in part by means of vacuum in a closed system to prevent the introduction or an infusion of air. For this purpose, I have constructed a sealed mold comprising a vacuum table having a perforated support surface covered with a woven cloth, upstanding side walls and a movable upper wall. The cementitious mixture is initially placed in the mold while the upper wall is removed. Then, the upper wall is sealed peripherally to the side walls by means of a flexible diaphragm which allows the upper wall to move downwardly against the cementitious mixture confined within the side walls. The use of vacuum with a closed mold of this kind not only places the mixture under compression but removes any air particles that may have become entrained in preparing the mixture. Moreover, since the mold is closed, there can be no infusion of air as would result by using ordinary vacuum tables and conventional techniques.

It will be evident that a vacuum mold of the type described may be used either by itself or together with additional compression means, as might be provided by placing a weight upon the movable upper wall. When used by itself, the vacuum pressure should be sufficient to apply a force of at least 5 p.s.i. With proper equipment, a compressive force may be developed which approaches existing air pressure.

After the concrete product has been formed it may be cured in many of the conventional ways. Where the concrete has been made from a mixture including Portland cement it may be allowed to set at room temperature for a customary 28 day period, or such time as considered appropriate under the circumstances. Of course, also, the setting time of the concrete may be accelerated by subjecting it to a humidified atmosphere and at a somewhat elevated temperature. These and other conventional curing practices may be utilized to obtain products having superior strength characteristics.

Figure 2:
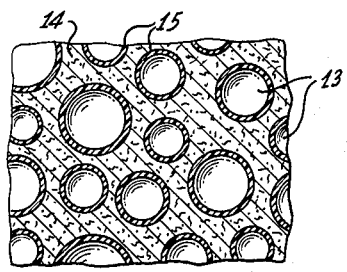
FIG. 2 is a magnified section taken through the concrete block of FIG. 1 after heating to a temperature of pellet fusion.

This invention also contemplates that those concrete products formed with pellets of polystyrene, or other heat fusible substances, may be further processed by heat treating to produce a product as shown in FIG. 2. This product has not only a high strength/weight ratio but is also less moisture absorbent than other light weight concretes. The product of FIG. 1, for example, may be heated to a sufficiently high temperature to melt the polystyrene pellets, causing said pellets to fuse as a molten substance. As a consequence, the melted pellets coat the inner surfaces of the matrix, leaving what may now be termed pellet-defining voids 13. Moreover, while the pellets are in a molten state they diffuse themselves into the fibrous filler and matrix, apparently as the result of capillary action. Thus, when the product is subsequently cooled, the polystyrene solidifies in its diffused positions, rendering the product substantially non-hygroscopic and moisture proof. The resulting product then comprises a polystyrene impregnated matrix 14 and shell-like inclusions 15 of polystyrene which coat the internal cement matrix and define the voids 13.

By way of further illustrating the processes involved in manufacturing the above described concrete products, and in order to show strength characteristics of certain products that have been made, the following recipes for the preparation and formulation of certain products are given as examples. It is to be understood that the examples hereinafter set forth are intended merely as being illustrative and not as limitations to the scope of the invention.

*Example I*

| Ingredients | Weight, Grams | Volume Ratio |
| --- | --- | --- |
| Portland Cement (Permanente Type III) | 13,660 | 1 |
| Asbestos fibers (Canadian Johns-Manville Grade 7M05, 0.0-0.0-1.0-15.0 minimum test) | 1,020 | 1 |
| Expanded Polystyrene (Expanded to approximately 1.5 lbs. per cu. ft. loose fill bulk density) | 520 | 2 |
| Water | 11,650 | 1.1 |

The asbestos fibers were fluffed for 3 minutes by a motor driven blade to produce maximum separation of the fibers. The cement and asbestos were then combined and further beaten for 5 minutes until a uniform distribution was obtained. Those two ingredients were then combined with water in a concrete mixer forming a uniform slurry. The expanded polystyrene was then added and mixed until evenly dispersed.

The resulting mix was poured from the mixer and its density was determined by weighing a measured volume. At this stage the density of the wet mix was 56.0 lb. per cu. foot.

The mix was then transferred to a one cubic foot container, the bottom of which comprised a vacuum plate covered with muslin through which water could be extracted. The top of the mold was then sealed with a flexible diaphragm and vacuum at approximately 27 inches of mercury was applied for one hour by means of a hose connection to the vacuum plate.

Water removed _____ grams__ 4780
Density after vacuum _____ lb. per cu. ft__ 52.0

After 18 hours the specimen was removed from the mold, saturated with water, wrapped and sealed in polyethylene and baked at 180° F. for 72 hours to accelerate curing. While this curing method is not recommended as a suitable general technique, an early indication of physical properties was needed.

At the conclusion of the first baking period the specimen was unwrapped and cut into 2 x 2 x 8 inch bars for strength testing. These bars were oven dried at 225° F. for 24 hours and then tested for flexure strength and compressive strength in accordance with ASTM specifications designation C-116 for compressive and designation C-78 for flexure.

Oven dry density _____lb. per cu. ft__ 40.6
Flexure strength _____ lb. per sq. in__ 215
Compressive strength _____do____ 913

At the time of water removal with vacuum a portion of the mix was placed in a separate container and not subjected to vacuum. This portion was allowed to cure for two weeks in a moist condition at room temperature. At the end of that time it was cut into 2 x 2 x 8 inch test bars and oven dried for testing in accordance with ASTM designations C-78 and C-116.

Lb. per cu. ft.
Oven dry density _____ 37.0
Flexure strength _____ 228
Compressive strength _____ 653

*Example II*

The specimen of this example differs from Example I in that a different ratio of ingredients including a superior grade of asbestos was used and a portion of the mix was subjected to a combination of vacuum and pressure.

| Ingredients | Weight, Grams | Volume Ratio |
| --- | --- | --- |
| Portland cement (Permanente Type III) | 13,180 | 1 |
| Asbestos fibers (Canadian Johns-Manville Plastobest 30) | 2,500 | 3 |
| Asbestos Fibers (Canadian Johns-Manville Type 7M05) | 12,200 | 5 |
| Expanded Polystyrene | 700 | 4.1 |
| Water | 1,800 | 1.7 |

The ingredients were combined as in Example I. After mixing the density of the mix was 47 lb. per cu. ft. Two thirds of the mix was placed in the vacuum mold described in Example 1. Water was extracted for one hour at a vacuum of approximately 27 inches of mercury. After 12 hours the mold was opened, the specimen was wrapped in polyethylene and baked at 180° F. for 72 hours. The remaining ⅓ of the mix was placed in a pressure chamber in which one side of the mass of cement was subjected to an air pressure of 25 p.s.i. gage by means of a rubber diaphragm and in which the other side was subjected to a vacuum of approximately 27 inches of mercury through a porous grid covered with muslin. Water was extracted for one hour. After 12 hours the pressure was released; the specimen was removed from the mold, wrapped in polyethylene and baked for 72 hours at 180° F.

Both specimens were then cut into 2 x 2 x 8 inch bars and oven dried at 225° F. for 24 hours. Strength tests in accordance with ASTM designations C-78 and C-116 were then conducted.

| | Specimen subjected to vacuum | Specimen subjected to vacuum and pressure |
| --- | --- | --- |
| Oven dry density, lb. per cu. ft. | 26.5 | 31.1 |
| Compressive strength, p.s.i. | 368 | 685 |
| Flexure strength, p.s.i. | 170 | 240 |

*Example III*

In this example the ratio of ingredients was adjusted and produced a concrete with high compressive strength while retaining the flexure strength of the previous examples.

| Ingredients | Weight, Grams | Volume Ratio |
| --- | --- | --- |
| Portland cement (Permanente Type III) | 17,304 | 1.0 |
| Pozzolan (Airox Co.) | 1,726 | 0.2 |
| Asbestos fibers (Canadian Johns-Manville Type 7M05) | 247 | 0.08 |
| Expanded polystyrene | 500 | 2.2 |
| Water | 11,750 | 0.85 |

The ingredients were combined in the same manner as in Example I. After mixing, the density of the mix was 61 lb. per cu. ft.

The mix was placed in a pressure chamber in which pressure and vacuum were simultaneously applied as described in Example II. After 12 hours the pressure was released and the specimen was removed from the mold, wrapped in polyethylene and baked for 72 hours at 180° F.

Test specimens 2 x 2 x 8 inches were cut, oven dried and tested as described in Example II with the following results:

Oven dry density _____ lb. per cu. ft__ 53.3
Compressive strength _____ p.s.i__ 1630
Flexure strength _____ p.s.i__ 249

Figure 3:
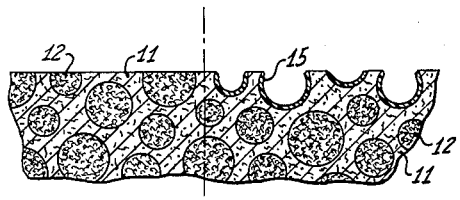
FIG. 3 is a magnified section of a product such as shown in FIG. 1, said product having been flash-heated over a portion of its upper surface.

An alternate manner of processing a concrete product such as shown in FIG. 1 is to apply a flash-heat over a portion, or all of its exterior surface. FIG. 3 illustrates the effect produced by flash-heating a portion of an exposed surface; and similar to the product of FIG. 2, the exposed pellets which are embedded in the surface, are melted, leaving voids which create a dimpled surface. This dimpled surface is excellent for grouting and lamination bonding purposes; it possesses a high degree of sound attenuation; and its attractive appearance provides unusual texture that should lend itself to interior and exterior decorations. Moreover, it has been found that a most unusual and attractive surface appearance can be created by first painting the surface, insuring that both the matrix and pellet defining voids are covered. Then, after the surface has dried, it is paint-rolled with a contrasting color. Since the roller will not extend into the voids, it will only cover the matrix with paint, thereby producing an extraordinary contrast of colors upon a three dimensional surface.

Figure 4:
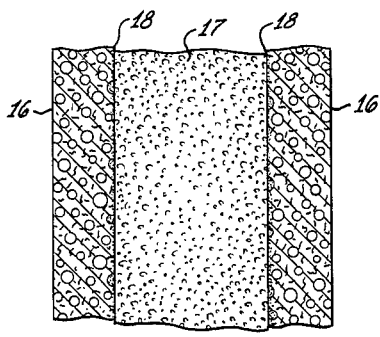
FIG. 4 is a transverse section of a panel structure formed with concrete products of the kind contemplated by this invention.

FIG. 4 of the drawings illustrates another product of this invention, one which may be used for building panels and walls. As shown, two concrete blocks 16, formed with polystyrene pellets as in making the product of FIG. 1, are joined together by an intermediate layer 17 of polyurethane. This product is made by placing the two blocks 16 in a mold, and in spaced relation to one another. A foaming material such as polyurethane is then deposited into the mold between the blocks; and the mold is immediately sealed and clamped. The pressures resulting from the foaming action cause the fluid foaming material to be driven into the contacted surfaces of blocks 16. As a consequence, the interfaces 18 are united in a strong mechanical bond. It will be understood that this product combines the structural strength of concrete with the excellent insulating qualities of the polyurethane and polystyrene. Moreover it is contemplated that an effective fire wall can be made by selective proportioning of the laminated thicknesses. For example, a 1 inch intermediate layer of polyurethane and ½ inch board thicknesses of concrete should prove to be useful. However, it is anticipated that the board thicknesses may be substantially greater, and even of unequal widths.

It is also contemplated that a useful laminated product can be made by adhesively joining layers of concrete with an intermediate layer of a material such as fiber glass, which possesses a high thermal insulating property. This product would, of course, also provide the necessary requirements of fire panel boards and the like, being of great strength as well as possessing inherent thermal and sound insulating properties.

While certain preferred embodiments of my invention have been illustrated and described, it will be realized that various changes and modifications can be made without departing from the spirit of this invention or the scope of the attached claims, and each of such changes or modifications is contemplated.

What I claim and desire to secure by Letters Patent is:

1. A method for making a concrete structural product comprising the steps: preparing a cementitious mixture including water, binding material, and discrete pellets of a resiliently compressible, relatively non-hygroscopic and low density substance; said pellets having an average uncompressed size that is greater than 1/16 inch in diameter; forming a product having a pre-stressed matrix with pellet occupying voids by applying a compressive force to said mixture and compressing said pellets in the cementitious mixture prior to hydraulic setting of the cementitious mixture, and maintaining said force until said mixture achieves a hydraulic set sufficient to maintain itself in a unitary state.

2. A method for forming a cementitious unitary mass comprising the steps of
   (a) providing a cementitious slurry of water, binding material, and discrete, resiliently compressible, relatively non-hygroscopic low density pellets having an average uncompressed particle size greater than 1/16 inch in diameter;
   (b) casting said slurry into a mold;
   (c) prior to any hydraulic set of the thus cast slurry, applying a compressive force to the unset slurry in said mold to compress said pellets; and
   (d) maintaining said compressive force on the thus cast slurry at least until said slurry has achieved an initial hydraulic set sufficient to maintain the mass of said slurry in a unitary state.

3. The method defined in claim 2 comprising the step of mixing a fibrous, water absorbing filler to said slurry before it is cast.

4. The method defined in claim 3 wherein said pellets are made of polystyrene.

5. The method defined in claim 2 wherein said pellets are made from a heat-fusible substance and wherein heat is applied to said unitary cementitious mass to at least melt the pellets embedded in the surface thereof, and allowing the thus melted pellets to be distributed into the cementitious mass.

6. The method defined in claim 2 wherein said pellets are made from a heat-fusible substance and wherein heat is applied to the thus formed unitary cementitious mass to (a) further cure said mass and (b) to melt said pellets, the melting of said pellets resulting in the distribution thereof into said cementitious mass.

7. The method defined in claim 2 comprising the step of removing excess water from said slurry in a water porous mold while said slurry is being subjected to said compressive force.

8. The method defined in claim 7 wherein said excess water is removed by subjecting said slurry to a vacuum which provides for a part of said compressive force.

9. A method of forming a cellular cementitious unitary mass comprising the steps of
   (a) providing a cementitious slurry consisting essentially of water, binding material, fibrous, water absorbing filler and discrete, resiliently compressible, relatively non-hygroscopic, low density pellets having an average uncompressed particle size greater than 1/16 inch in diameter;
   (b) casting said slurry into a mold;
   (c) prior to any hydraulic set of the thus cast slurry, applying a compressive force to the unset slurry to compress said pellets; and
   (d) maintaining said compressive force on the slurry at least until said slurry achieves an initial hydraulic set sufficient to maintain the mass of said slurry in a unitary state.

10. The method defined in claim 9 wherein said pellets are made from polystyrene.

11. The method defined in claim 9 comprising the step of flash heating the surface of the hydraulically set, unitary cementitious mass to melt said pellets embedded in the surface thereof and thereby provide pellet defining voids.

12. The method defined in claim 9 wherein said compressive force is at least 10 p.s.i.

References Cited by the Examiner

UNITED STATES PATENTS

| | | |
|---|---|---|
| 1,344,324 | 6/1920 | Walter. |
| 1,782,384 | 11/1930 | Greider _____ 264—42 |
| 1,841,215 | 1/1932 | Schneider. |
| 2,311,358 | 2/1943 | Baily _____ 264—86 |
| 2,797,201 | 7/1957 | Veatch. |
| 2,798,278 | 7/1957 | Johnson _____ 25—1 |
| 2,996,389 | 8/1961 | Fernhof. |
| 3,021,291 | 2/1962 | Thiessen _____ 106—90 |
| 3,023,116 | 2/1962 | Alfurd _____ 106—90 |

FOREIGN PATENTS 48,872  7/1919  Sweden.

OTHER REFERENCES

Nevere Verfahren zur Verarbeitung von Styropor, pages 18–19 relied upon, December 1955.

ROBERT F. WHITE, *Primary Examiner.*

ALEXANDER H. BRODMERKEL, *Examiner.*